US006553214B1

United States Patent
Rabinovich et al.

(10) Patent No.: US 6,553,214 B1
(45) Date of Patent: Apr. 22, 2003

(54) ACTIVE WINDOW GLASS ANTENNA SYSTEM WITH AUTOMATIC OVERLOAD PROTECTION CIRCUIT

(75) Inventors: Victor Rabinovich, Richmond Hill (CA); Irina Rabinovich, Richmond Hill (CA); Terrance R. Reardon, Keswick (CA)

(73) Assignee: Tenatronics Limited, New Market (CA)

( * ) Notice: Subject to any disclaimer, the term of this patent is extended or adjusted under 35 U.S.C. 154(b) by 0 days.

(21) Appl. No.: 09/565,706

(22) Filed: May 5, 2000

Related U.S. Application Data

(60) Provisional application No. 60/132,623, filed on May 5, 1999.

(51) Int. Cl.$^7$ ................................................. H04B 1/16
(52) U.S. Cl. .................. 455/217; 455/561; 455/562; 455/277.1; 455/277.2; 343/701; 343/704
(58) Field of Search ................................ 455/217, 561, 455/562, 277.1, 277.2, 269, 280; 343/701, 704, 713

(56) References Cited

U.S. PATENT DOCUMENTS

| | | | |
|---|---|---|---|
| 3,622,891 A | | 11/1971 | Leland |
| 3,992,669 A | * | 11/1976 | Dades .......................... 330/51 |
| 4,158,814 A | | 6/1979 | Imazeki et al. |
| 4,163,195 A | | 7/1979 | Sauer |
| 4,218,774 A | | 8/1980 | Kondo |
| 4,247,954 A | | 1/1981 | Sauer |
| 4,260,989 A | | 4/1981 | Ishii et al. |
| 4,531,234 A | | 7/1985 | Bell |
| 4,757,277 A | | 7/1988 | Nakase et al. |
| 4,791,426 A | | 12/1988 | Lindenmaier et al. |
| 5,230,096 A | * | 7/1993 | Davies et al. ................ 455/217 |
| 5,300,897 A | | 4/1994 | Shiga |
| 5,307,026 A | | 4/1994 | Mucke |
| 5,465,408 A | | 11/1995 | Sugayama et al. |
| 5,638,141 A | | 6/1997 | Bae et al. |
| 5,678,214 A | * | 10/1997 | Azuma ........................ 455/217 |
| 5,722,063 A | | 2/1998 | Peterzell et al. |
| 5,745,844 A | | 4/1998 | Kromer et al. |
| 5,778,310 A | | 7/1998 | Tong et al. |
| 5,790,079 A | | 8/1998 | Zafar |
| 5,794,134 A | | 8/1998 | Enoki et al. |
| 5,841,319 A | | 11/1998 | Sato |

OTHER PUBLICATIONS

K. Fijimoto and J. R. James, Mobile Antenna System Handbook, Artech House, 1994, pp. 297–311.

* cited by examiner

Primary Examiner—William Trost
Assistant Examiner—Sharad Rampuria
(74) Attorney, Agent, or Firm—Fay, Sharpe, Fagan, Minnich & McKee, LLP

(57) ABSTRACT

A window glass antenna system for the reception of AM and FM radio broadcasts in an automobile includes an antenna grid applied to a window of a vehicle, that is electrically separate from a heater grid applied to the rear window. An antenna module connected to the vehicle window antenna grid is comprised of a low noise amplifier, matching, and overload protection circuits. The overload protection circuit is included between the antenna grid and the RF amplifier. When the received radio antenna signal is at the typical operating level of the amplifier, the overload protection circuit connects the output of the antenna grid to the RF amplifier.

When the received signal is higher than the linear dynamic range of the amplifier the overload protection circuit provides linearity of the signal that is applied to the car radio. This process consists of two steps. In the first step, the overload protection circuit automatically decreases the signal applied to the amplifier so that the amplifier output signal does not change. In the second step, when the output antenna signal is very high, the overload protection circuit automatically provides bypassing of the amplifier and connects the antenna directly to the car radio without the amplifier stage.

20 Claims, 5 Drawing Sheets

ACTIVE WINDOW GLASS ANTENNA SYSTEM WITH AUTOMATIC OVERLOAD PROTECTION CIRCUIT

This application claims priority to U.S. Provisional Application Ser. No. 60/132,623 filed May 5, 1999.

BACKGROUND OF THE INVENTION

The present invention relates generally to an antenna system for a vehicle radio and more particularly to an active antenna system where antenna elements are printed on a window glass of the vehicle. Most vehicle antenna systems include a mast antenna that provides acceptable AM and FM reception. Such antennas have certain disadvantages, including wind noise, increased drag on the vehicle, corrosion of the antenna, and risk of vandalism.

Printed on car window glass antennas do not have such disadvantages. On the other hand, it is known (K. Fujimoto and J. R. James, Mobile Antenna Systems Handbook, Artech House 1994, pages 297–311) that the gain of passive screen (i.e. printed glass) antennas is between −6 to −10 dB compared to a standard mast or whip antennas in the AM and FM frequency range. This means that the passive antenna structure does not meet the performance of a whip antenna. An active screen antenna (i.e. printed on glass antenna plus amplifier) can improve antenna performance in this situation. An increase in signal to noise ratio when using an active screen on glass antenna system compared to the whip antenna can be calculated using the following formula:

$$\gamma = G_{print}/G_{whip} * F_{rec}/(F_{amp}+(F_{rec}-1)/G_{amp}) \quad \text{(Eq. 1)}$$

where, $G_{print}$=gain of the printed on glass antenna; $G_{whip}$=gain of the whip antenna; $F_{rec}$=noise figure of the receiver; $F_{amp}$=noise figure of the amplifier; and $G_{amps}$=gain of the amplifier. Procedures used to obtain values of the foregoing variables are well known in the industry, and therefore need not be described in detail.

With attention to Eq. 1, as an example, it is assumed the gain of a whip antenna ($G_{whip}$) is ten times more than the gain of a printed on glass antenna ($G_{print}$) and noise figure of the receiver ($F_{rec}$) is ≈10. If the amplifier gain ($G_{amp}$) is equal to 10, and the noise figure of the amplifier ($F_{amp}$) is ≈3, the value of γ calculated by equation 1 is to about 1 (more specifically it is 0.83). This means that the signal to noise ratio using either a whip antenna or a printed on glass active antenna system is approximately the same. Therefore a satisfactory signal to noise ratio can be obtained using a glass antenna with an amplifier.

Printed on glass active antenna system are described in many different publications, for example U.S. Pat. Nos. 4,163,195; 4,757,277; 4,791,426; 4,260,989. In all these prior art antenna systems the antenna amplifier does not have an overload protection circuit. Some of them do however have excellent linear dynamic range. As an example, an amplifier described in the Mobile Antenna Systems Handbook, page 305, with an output amplifier signal equal to −7 dBm (50 Ohm input impedance) generates an intermodulation product, exceeding the noise level by only 2 dB. On the other hand it is known that the radio frequency (RF) electromagnetic signal in some areas (for example, cities such as New York, Detroit, etc.) can reach extremely high levels of up to 10 dBm or more. Such extremely high RF signal levels generate a high intermodulation distortion signal in the RF amplifier.

A third order intermodulation signal level P3 can be expressed as follows.

$$P3=3PO-2IP3 \quad \text{(Eq. 2)}$$

Here PO is the output amplifier power, and IP3 is the third order interception power level. It is seen from this expression that P3 can be very high. For example, an output amplifier signal of 20 dBm causes an intermodulation distortion level P3 of −10 dBm if the third order interception power level of the amplifier IP3=35 dBm. When there are two high level received signals with frequencies F1 and F2, a third order signal having a frequency F3=2F2−F1 or F3=2F1−F2 is produced. If the two frequencies F1 and F2 are present at relatively near frequencies, a signal generated by the intermodulation has approximately the same frequency as that of another broadcasting station. Therefore intermodulation interference occurs and the signal of the desired station with frequency F3 can be mixed and distorted.

An overload protection circuit such as described in U.S. Pat. No. 5,230,096 automatically estimates an output antenna signal level in an operating frequency range and sufficiently decreases the output intermodulation product when the output antenna signal is out of the linear amplifier dynamic range. This overload protection circuit bypasses the RF amplifier when the signal applied to the amplifier is out of linear dynamic range of the amplifier. However, when the bypassing process has been started, the sensitivity (i.e. the signal to noise ratio) of the active antenna system drops off. It is desirable therefore to smooth out this sudden degradation of signal sensitivity by using additional automatic gain control on the signal.

SUMMARY OF THE INVENTION

An object of the present invention is to provide broadcast signal reception using an active antenna system without intermodulation distortion while improving sensitivity when the overload protection circuit is in operation.

According to the present invention the overload protection circuit is installed between the antenna and the amplifier. This circuit comprises a directional coupler, a detector for detecting an envelope level of an output antenna signal, an operational amplifier for amplification of a DC signal, a variable value shunt impedance controlled by the output signal of the operational amplifier, a comparator, an electronic switch and matching circuits. When the received antenna signal is at a typical operating level of the amplifier, the overload protection circuit connects the output of an antenna to the RF amplifier. When the received signal is out of the linear dynamic range of the amplifier, the overload protection circuit provides linearity of the signal that is applied to the radio.

This process is comprised of two steps. In the first step, the overload protection circuit automatically decreases the signal applied to an amplifier so the amplifier output signal does not change. In the second step, when the output antenna signal is very high, electronic switching of the overload protection circuit automatically provides bypassing of the amplifier and connects the antenna directly to the car radio without an amplifier.

BRIEF DESCRIPTION OF THE DRAWING

The advantages of the present invention will become more apparent by the detailed description of the following drawings.

DETAILED DESCRIPTION OF THE INVENTION

This invention employs a prior art, active antenna system with modifications that make it possible to achieve improved sensitivity when using an active printed on glass antenna system with overload protection circuit. The overload protection circuit of this system is most useful when strong RF input signals cause intermodulation distortion.

Figure 1:
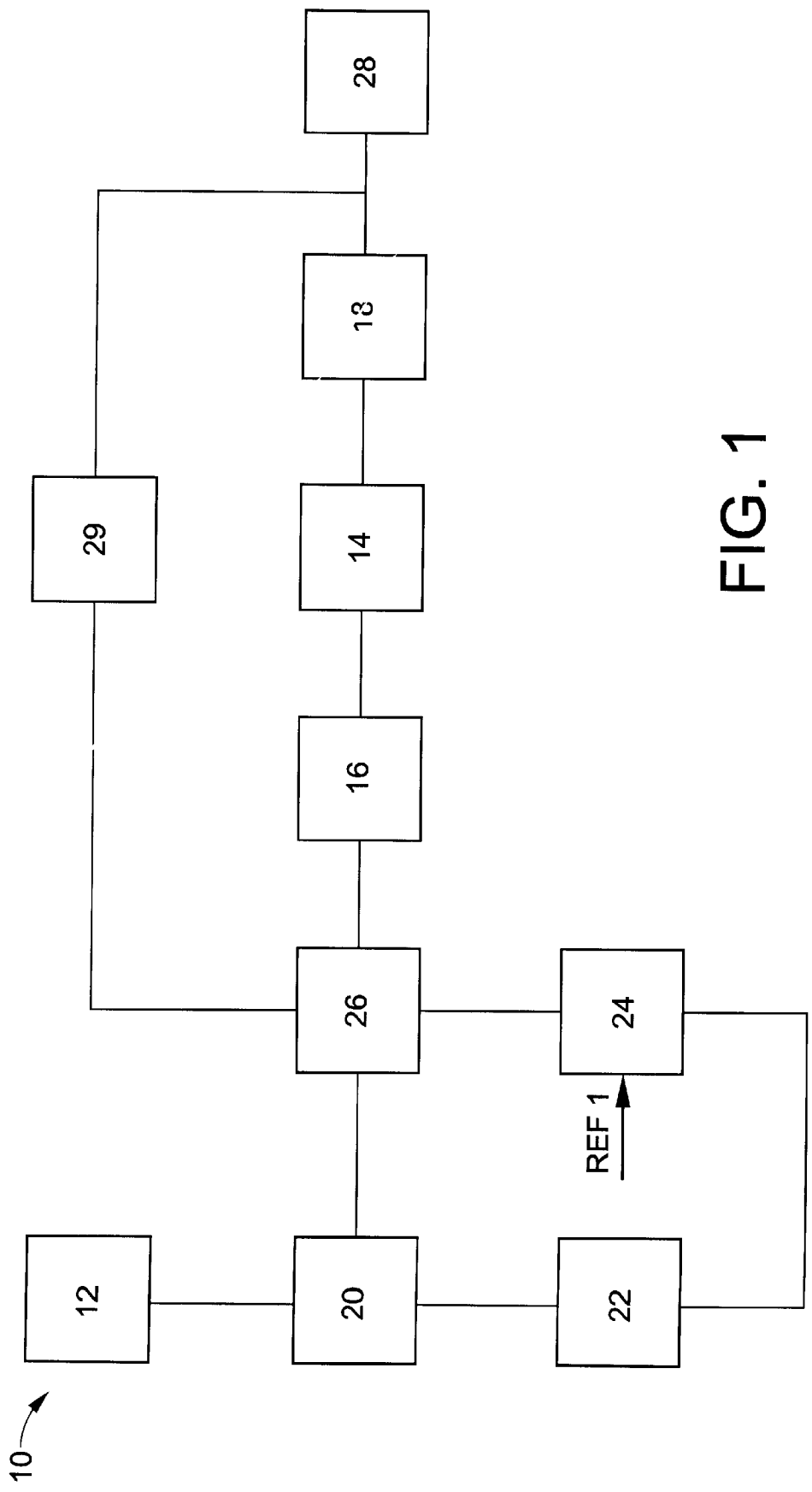
FIG. 1 is an equivalent circuit of a prior art employing an amplifier circuit.

With reference to FIG. 1, a simplified prior art broadcast signal receiving antenna system 10 is shown. System 10 illustrates an active antenna system with overload protection. The antenna system includes an antenna printed on glass 12, RF amplifier 14, matching circuits 16 and 18, a directional coupler 20, a detector 22, a comparator 24, a 26 and a radio 28. Some patents teach the use of separate AM-band and FM-band amplifier circuits, and some patents teach the use of only one RF amplifier for receiving both AM and FM frequency range signals. The present invention may be used with both such concepts.

During the operation of circuit 10, when the power of the RF signal picked up by antenna 12 exceeds a predetermined intermodulation level Ref. 1, a control signal output from the comparator 24 operates switch 26, to establish a bypass path 29 around RF amplifier 14, thereby removing RF amplifier 14 from the antenna arrangement.

Figure 2:
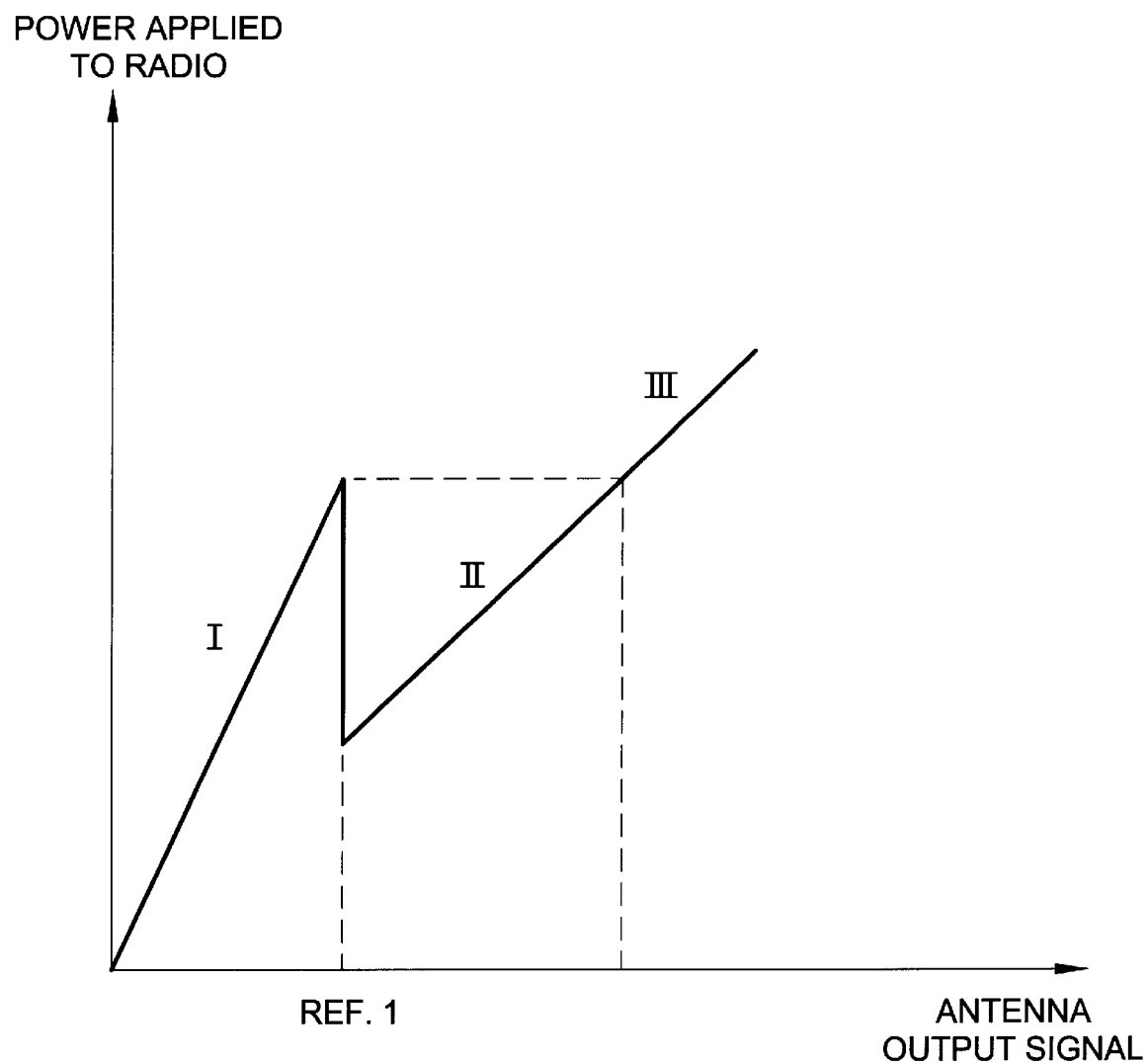
FIG. 2 is a plot of the output signal applied to the car radio versus the output antenna signal in the prior art.

With reference to FIG. 2, illustrated is the input signal (power) applied to the car radio as a function of the antenna output signal. It can be seen from the graph, that when the overload protection circuit begins operating (i.e. at Ref. 1), the sensitivity of this system drops off (i.e. at Section II).

Figure 3:
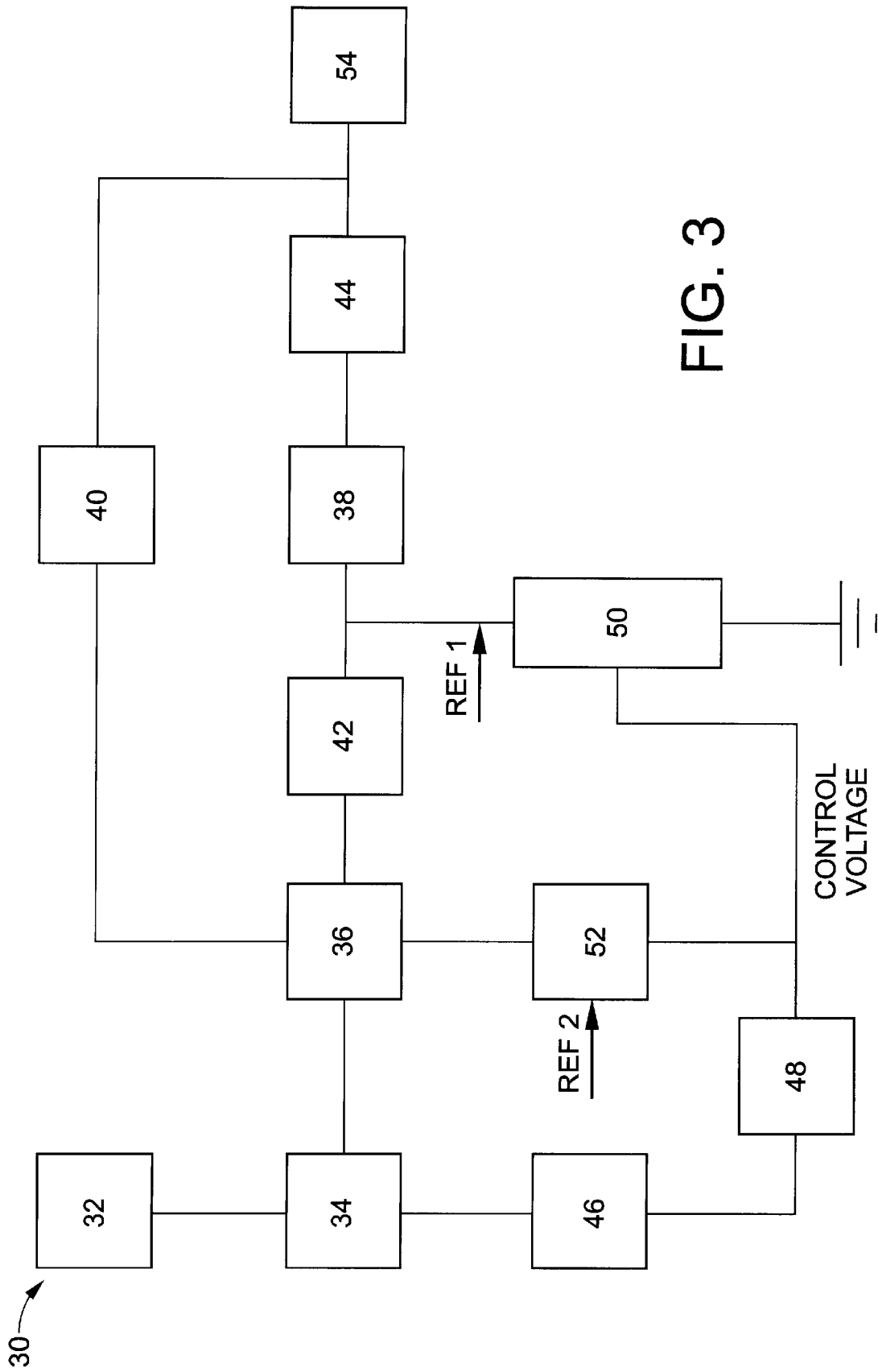
FIG. 3 shows a circuit embodiment of the invention that employs shunt impedance control and an electronic switch for bypassing of the amplifier.

With reference to FIG. 3, a block diagram of a preferred embodiment of a broadcast signal receiving antenna system 30 of the present invention is shown. This system comprises a printed antenna 32, directional coupler 34, electronic switch 36, RF low noise amplifier 38, matching circuits 40, 42, and 44, detector 46, operational amplifier 48, variable shunt impedance 50, comparator 52, and car radio 54.

A signal picked up by antenna 32, is supplied to amplifier 38, through directional coupler 34, electronic control switch 36, and matching circuit 42. In system 30, the overload protection circuit may be considered to include directional coupler 34, electronic switch 36, detector 46, operational amplifier 48, variable shunt impedance 50, comparator 52, and a bypass circuit path 29a. Matching circuits 40, 42, and 44 may be considered as impedance matching circuits which provide for the proper signal to be applied in stages following the matching operation.

A signal strength estimator of the overload protection circuit is made up of directional coupler 34, detector 46, and operational amplifier 48. The detector 46 detects a small part of the variable signal generated by the antenna 32. The operational amplifier 48 amplifies this signal so that output of the operational amplifier is a variable value of the input RF electromagnetic field strength and can be used to control the signal applied to the RF amplifier 38.

Assuming the output antenna signal is in the linear dynamic range of the RF amplifier 38, then the signal output by the operational amplifier 48 is small. In this situation, control switch 36 connects the output of antenna 32 to the RF amplifier 38. The variable shunt impedance 50 is made sufficiently high compared to the input impedance of the amplifier 38 so as to not affect operation of the circuit.

When the output signal of antenna 32 exceeds a predetermined first level, just below that at which the RF amplifier 38 tends to produce an output signal containing intermodulation products, a control voltage from the output of the operational amplifier 48 decreases the shunt impedance value of shunt impedance 50. Altering the output impedance decreases the signal supplied to amplifier 38, such that the output signal of amplifier 38 does not change. The DC voltage from the output of the operational amplifier 48 begins to change shunt impedance 50 at the reference level Ref. 1. This reference signal is determined by a 1 dB compression point of the RF amplifier 38. During this stage of operation, control switch 36 continues to connect antenna 32 to the RF amplifier 38.

In the prior art FIG. 1, at this signal point (Ref. 1), switch 26 would establish a bypass path (e.g. 29 of FIG. 1) around RF amplifier 14.

Figure 4:
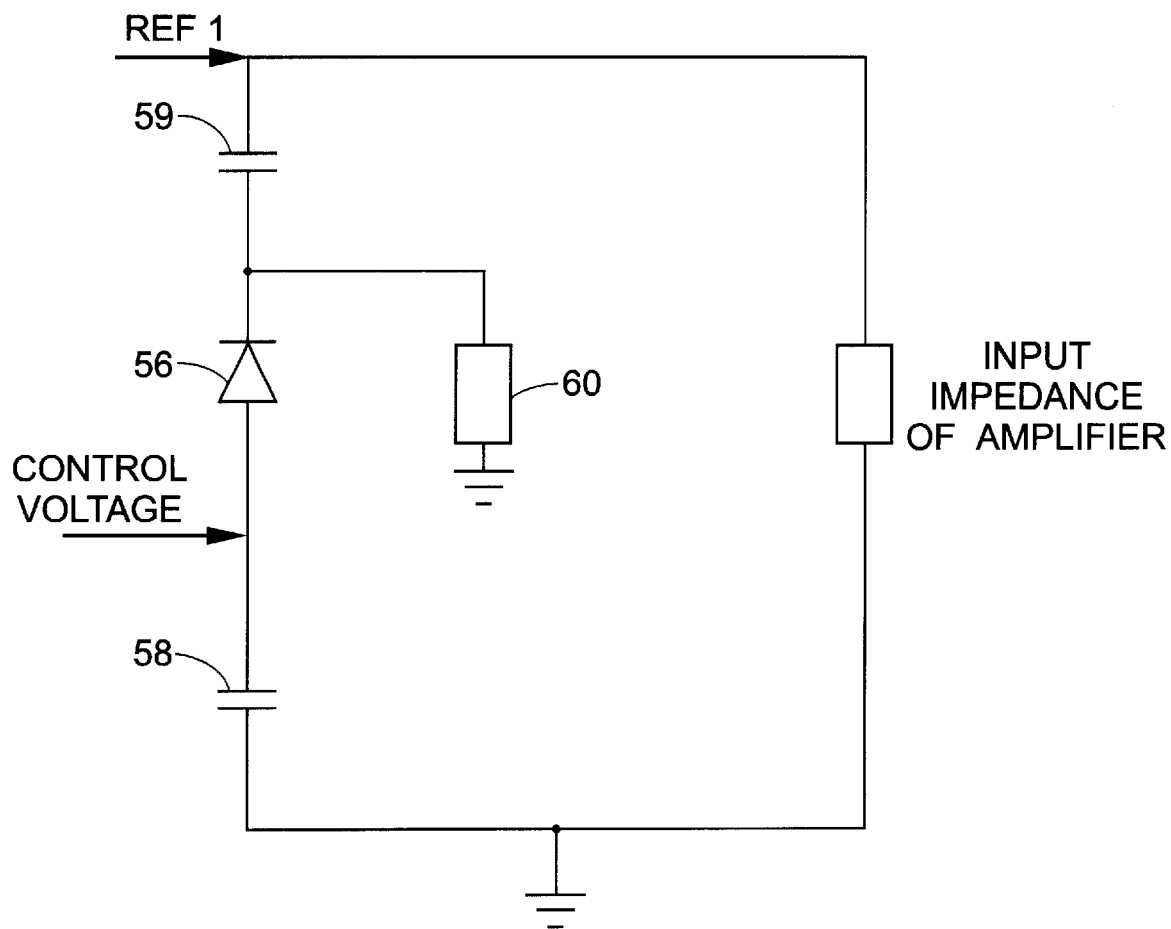
FIG. 4 is an example of the shunt impedance control.

Returning to the concepts of the present invention, variable impedance 50 of FIG. 3 may be configured as the simple circuit arrangement using a pin-diode 56, capacitors 58 and 59, and resistor 60 of FIG. 4 or as other known signal decreasing of attenuator circuit designs.

Next, when the output signal from antenna 32 is above a reference signal by a second value (Ref. 2), the control voltage from comparator 52 automatically selects the bypass path 29a with only matching circuit 40 included. The reference signal level Ref2 is the start point for bypassing the RF amplifier 38. This level is determined by the value of: Ref.2=Ref.1+$G_{amp}$. In this case the output of antenna 32 is connected to radio 54 without passing through RF amplifier 38.

Figure 5:
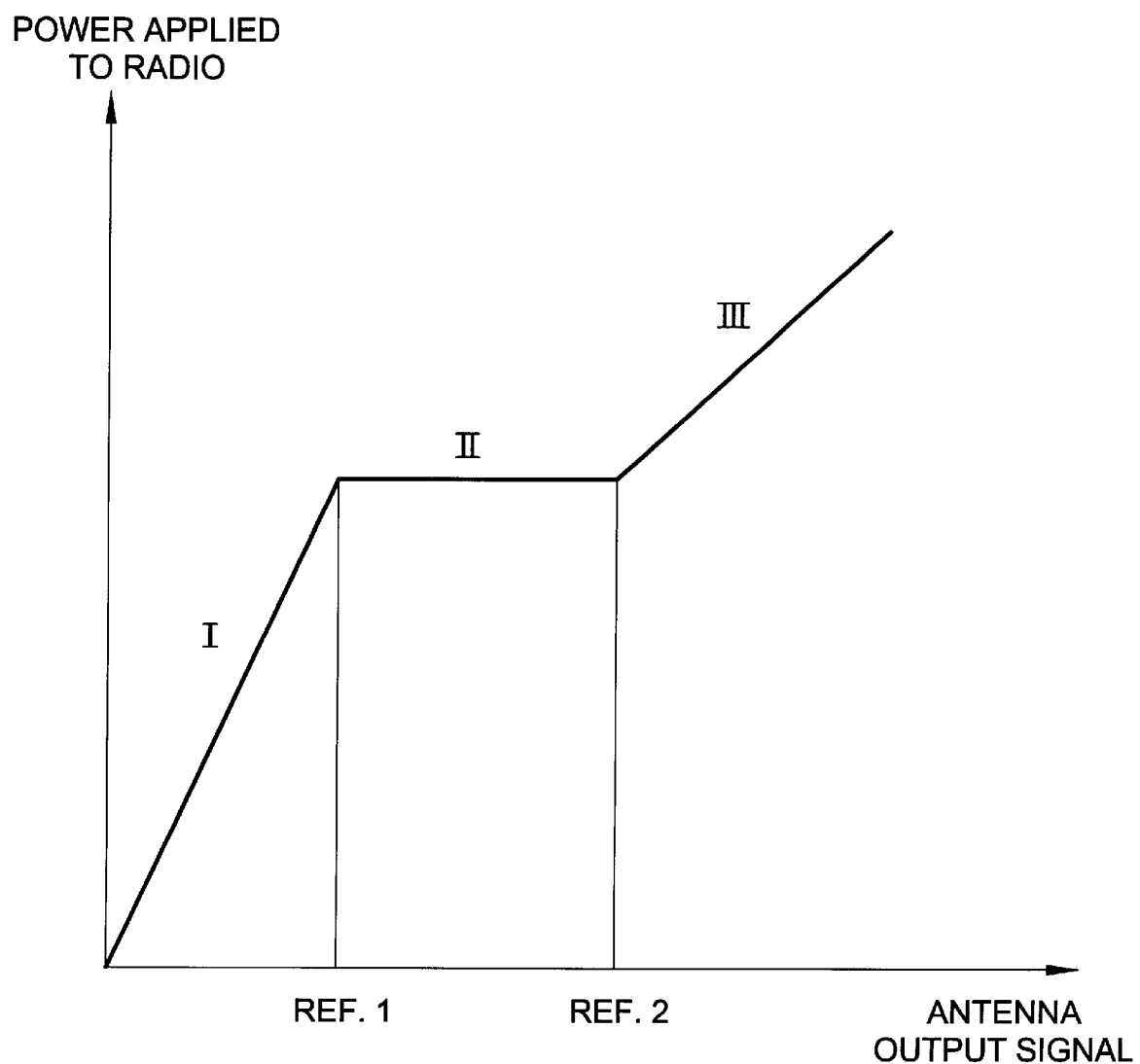
FIG. 5 is a plot of the output signal applied to the car radio versus the output antenna signal.

Such logic and circuit configuration excludes intermodulation distortion in the active antenna system and improves the sensitivity of this system compared to the prior art. FIG. 5 depicts an output signal (power) level applied to the car radio as a function of the output antenna signal. It can be seen that part I and part III of this graph are linear functions, and part II has a constant output. This graph illustrates that the signal applied to the radio receiver (sensitivity) is higher in range II compared to the prior art as shown in FIG. 2.

Thus, the present invention includes two steps of control. At a first level of control, the signal applied to the RF amplifier is reduced so that the signal generated by the RF amplifier 38 does not depend on the output antenna signal. At the second control level, RF amplifier 38 is bypassed, and the signal value picked by the radio 54 is appropriately modulated. Thus at a first level (II of FIG. 5) the present circuit maintains the signal constant as it is applied to the radio 54. At the second control level (III), the bypassed signal applied to the radio 54 is linear.

Inasmuch as the present invention is subject to variations, modifications, and changes in detail, it is intended that all matter described throughout this specification and shown in the accompanying drawings, be interpreted as illustrative only and not in a limiting sense. Accordingly it is intended that the invention be limited only by spirit and scope of the hereto attached claims.

What is claimed is:

1. An active antenna system with automatic overload protection circuitry, comprising:
   an antenna;
   a directional coupler connecting the antenna, an electronic switch and a detector;
   an RF low noise amplifier connected to the electronic switch via a first matching circuit;
   an operational amplifier having an input connected to the detector, and an output connected to a variable shunt impedance and a comparator, the operational amplifier configured to generate a control voltage when a value of an antenna signal is greater than a first reference signal, the control voltage acting to lower impedance of the variable shunt impedance, wherein a signal to the RF low noise amplifier is decreased;

a bypass path including a second matching circuit, which bypasses the RF low noise amplifier, wherein the bypass path is actuated when the antenna signal is greater than a second reference signal; and, a radio connected to the RF low noise amplifier via a third matching circuit and connected to the bypass path.

2. The active antenna system according to claim 1 wherein an overload protection circuit includes the directional coupler, detector, operational amplifier, comparator, electronic switch, bypass path, and variable impedance.

3. The active antenna system according to claim 2, wherein a signal strength estimator of the overload protection circuit is comprised of the coupler, detector and operational amplifier.

4. The active antenna system according to claim 2, wherein the output of the operational amplifier is a variable level signal, proportional to the input RF electromagnetic field strength, which is used to control the signal level applied to the RF amplifier.

5. The active antenna system according to claim 4, wherein the lowering of the shunt impedance level, maintains a constant signal level on the RF amplifier preventing intermodulation distortion.

6. The active antenna system according to claim 1, wherein a pin-diode is configured as a variable impedance device, said variable impedance being a function of the detector level and the operational amplifier device characteristics.

7. The active antenna system according to claim 1, wherein the second reference signal level, is an initial starting level for determining a signal level at which to bypass the RF amplifier and thereby prevent intermodulation distortion.

8. The active antenna system according to claim 7, wherein the second reference signal level, is calculated by adding a first reference signal value, to operational amplifier gain.

9. The active antenna system according to claim 1, wherein a control voltage from the comparator automatically selects the bypass circuit path which includes a corresponding, matching circuit, and prevents intermodulation distortion when an antenna output signal level is greater than the second reference signal level.

10. A method of operating an active antenna system with overload protection:

receiving a signal from an antenna;
supplying the received signal to a direction coupler;
delivering a first portion of the received signal from the direction coupler to an electronic switch and a second portion of the received signal to a detector;
amplifying the second portion of the signal by an amplifier and supplying the amplified signal to a comparator;
comparing, by the comparator, between the amplified second portion of the signal and a reference signal;
determining whether the amplified second portion is, (i) less than or equal to a first reference signal, (ii) greater than the first reference signal, (iii) greater than a second reference signal;
passing the first signal portion to a RF amplifier when the second signal portion is less than or equal to the first reference signal, wherein the RF amplifier is supplied with a full signal;
passing the first signal portion to the RF amplifier, when the second portion of the signal is greater than a first reference signal, wherein the signal supplied to the RF amplifier is decreased;
activating the electronic switch to switch the first portion of the signal to a bypass path, when the comparing step finds the second portion of the signal is greater than a second reference signal;
matching the signal on the bypass path to a selected impedance value; and
delivering the impedance matched signal to a radio.

11. The method according to claim 10, wherein the first reference signal is less than the second reference signal.

12. The method according to claim 11, wherein the second reference signal level, is calculated by adding the first reference signal value to the operational amplifier gain.

13. The method according to claim 10 wherein the signal supplied to the radio when the generated antenna signal is less than the first reference signal is linear.

14. The method according to claim 10 wherein the signal supplied to the radio when the generated antenna signal is greater than the first reference signal but less than a second reference signal is constant.

15. The method according to claim 10 wherein the signal supplied to the radio when the generated antenna signal is greater than the second reference signal is linear.

16. A method of operating an active antenna system which receives an antenna signal from an antenna:

designing an electronic switch system to receive at least a first portion of an antenna signal;
designing a detector to receive at least a second portion of the antenna signal;
determining whether the second portion is, (i) less than a first reference signal, (ii) greater than the first reference signal, (iii) greater than a second reference signal;
passing the first signal portion to a RF amplifier when the second signal portion is less than the first reference signal, wherein the RF amplifier is supplied with a full signal;
decreasing the signal to be supplied to the RF amplifier when the second portion of the signal is greater than the first reference signal;
passing the decreased first signal to the RF amplifier;
activating the electronic switch to switch the first signal portion to a bypass path, when the second portion of the signal is greater than the second reference signal; and
delivering bypass antenna signal to the load.

17. The method according to claim 10 wherein the signal supplied to the load when the generated antenna signal is less than the first reference signal is linear.

18. The method according to claim 10 wherein the signal supplied to the load when the generated antenna signal is greater than the first reference signal but less than the second reference signal is constant.

19. The method according to claim 10 wherein the signal supplied to the load when the generated antenna signal is greater than the second reference signal is linear.

20. An active antenna system comprising:

an RF amplifier configured to receive signals from an antenna;
a load in operational connection to the RF amplifier;
an overload protection circuit in operational connection to the RF amplifier, and including a first operational arrangement and a second operational arrangement, the first operational arrangement including,
- a detector system configured to detect at least a portion of an antenna signal, as a representative value of the antenna signal;
- a first reference signal;
- an amplifying amplifier configured to receive at least a portion of the antenna signal and to selectively generate a control signal;
- a variable attenuator connected to the amplifying amplifier and the RF amplifier, the variable attenuator being altered dependant upon the value of the control signal;
- a first path, including the RF amplifier, from the input to a load, the first path provided with a full antenna signal when the antenna signal is less than the first reference signal, and is provided with a reduced antenna signal when the antenna signal is greater than the first reference signal;

the second operational arrangement including,
- the detector system configured to detect at least the portion of the antenna signal, as the representative value of the antenna signal;
- a second reference signal;
- a comparator system configured to compare the second reference signal and the detected antenna signal; and
- a second path from the input to the load, wherein the second path bypasses the RF amplifier, and is provided with the antenna signal when the output of the comparator indicates the value of the antenna signal is greater than the second reference signal.

* * * * *